April 16, 1968  F. R. CAMPBELL  3,377,737
COMBINATION LURE CARRIER AND LEADER DISPENSER
Filed Oct. 21, 1965  3 Sheets-Sheet 1
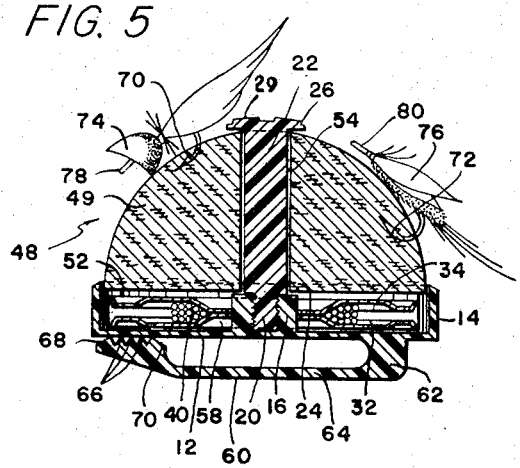
FIG. 5
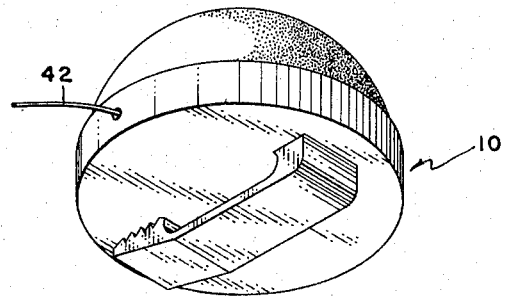
FIG. 1
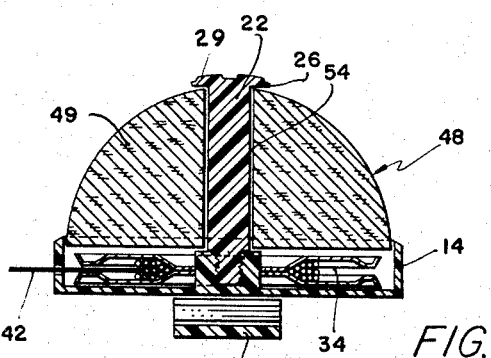
FIG. 4
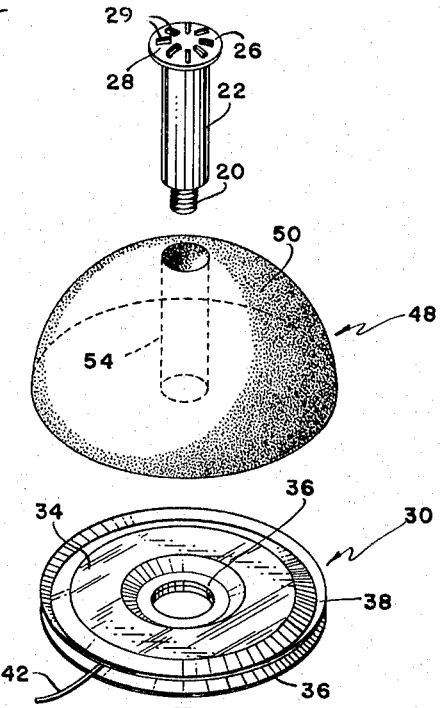
FIG. 2
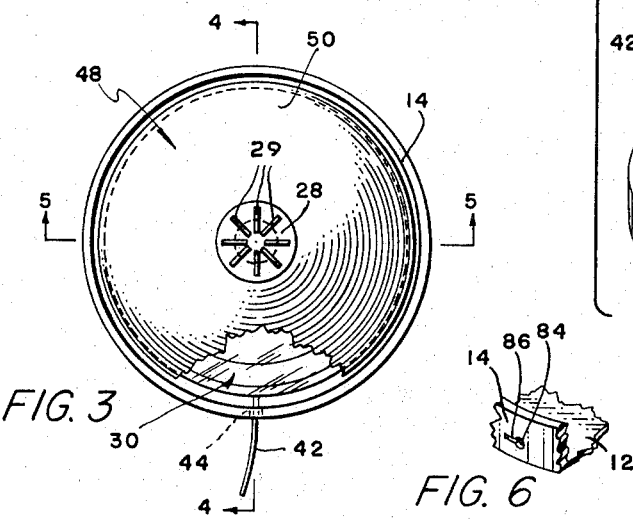
FIG. 3
FIG. 6
INVENTOR.
FLOYD R. CAMPBELL
BY
Robert E. Breidenthal
ATTORNEY

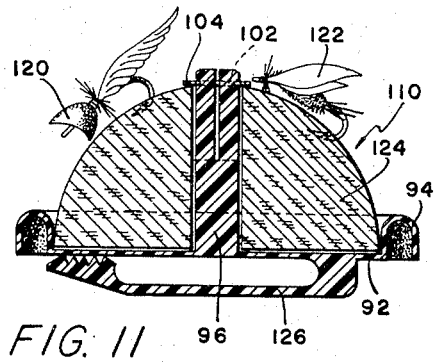
FIG. 11
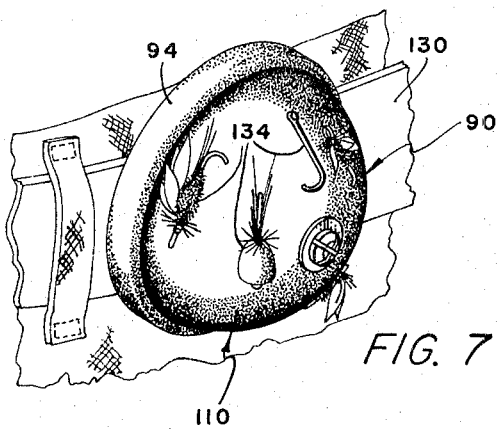
FIG. 7
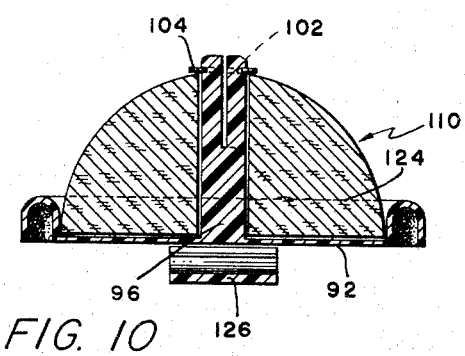
FIG. 10
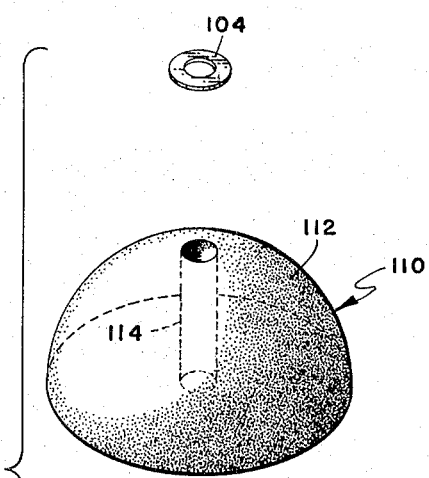
FIG. 8
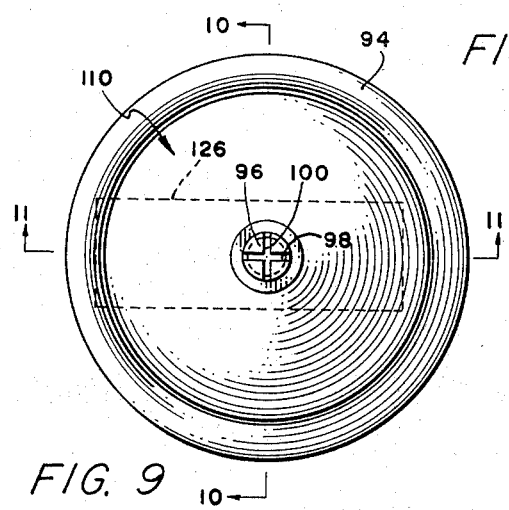
FIG. 9
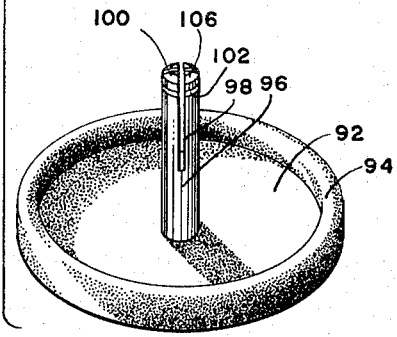
INVENTOR.
FLOYD R. CAMPBELL April 16, 1968     F. R. CAMPBELL     3,377,737
COMBINATION LURE CARRIER AND LEADER DISPENSER
Filed Oct. 21, 1965

INVENTOR.
FLOYD R. CAMPBELL
BY
ATTORNEY

United States Patent Office 3,377,737
Patented Apr. 16, 1968

3,377,737
COMBINATION LURE CARRIER AND
LEADER DISPENSER
Floyd R. Campbell, Wichita, Kans., assignor of fifty percent to Vincent J. Walter, Wichita, Kans.
Filed Oct. 21, 1965, Ser. No. 499,684
8 Claims. (Cl. 43—57.5)

ABSTRACT OF THE DISCLOSURE

A fisherman's accessory which is provided with a clip for attachment to the user's belt or other part of his clothing, and which accessory includes an outwardly facing rotatably mounted body that is pierceable for removable retention of hooks, flies, lures, and the like. The accessory also includes a rotatably mounted reel for dispensing such lengths of leader or the like needed, and provision is made for enabling the user to sever a selected length of line from the reel.

This invention relates to new and useful improvements in fishermen's accessories, and more particularly relates to a device releasably attachable to a tackle box partition or clothing of a fisherman (such as his belt or at the edge of a shirt or trousers pocket), which device includes a rotatable body that is pierceable by fishing hooks or the like to releasably retain fishing lures or flies, and which device optionally though preferably includes provision for containing and dispensing flexible line or leader in quantities desired by the fisherman.

The primary object of this invention is to provide a device of the character specified above which may be carried upon the person of a fisherman in an accessible position such that the pierceable object or fishing hook equipped element holding means can be rotated to fully expose visually objects held thereby as well as areas of such means unoccupied and available for piercing holding use.

Another object of the invention is to provide a device of the character indicated in the preceding paragraphs such that the object holding means may be released for replacement or repair or for storage of objects piercingly held thereby.

Yet another object of the present invention is to provide a device of the character described which includes a rotatable reel for carrying and dispensing therefrom the flexible line or leader.

Still another object of the invention is to provide a device of the character described such that the reel is releasable or removable, whereby a reel may either be conveniently provided with a new supply of flexible line or leader, or an exhausted reel may be replaced with a reel on which a fresh supply of flexible line or leader is wound.

Still another object of the invention is to provide a device of the character thus far described which includes an opening through which flexible line or leader is dispensed from the reel together with means for realeasably preventing passage of flexible line or leader through such opening, and to provide means adjacent such dispensing and guiding opening for severing the flexible line or leader.

A broad aspect of the invention involves an article of manufacture comprising a base plate, object holding means comprising a body of pierceable material for releasably retaining objects pierced thereinto, and mounting means securing the holding means to the base plate for rotation relative thereto about an axis normal to the base plate.

Still another broad aspect of the invention involves an article of manufacture comprising a generally circular base plate having first and second sides provided with a post extending centrally from the first side of the base plate, annular object holding means journaled on the post of pierceable material for releasably retaining objects pierced thereinto, said last means having a side opposite the base plate having a generaly convex configuration, said post being provided with means for preventing removal of said object holding means from the post, and said base plate being provided with means disposed on the second side thereof for mounting the base plate on a support.

Still another aspect of the invention involves an article of manufacture such as set forth in the preceding paragraph, wherein said object holding means is spaced from the base plate to define an annular space therebetween, said post being adapted to accommodate a reel of flexible line journaled thereon between the object holding means and the base plate, said base plate having a peripheral flange extending about said space, and said flange having an opening, preferably key-shaped, therethrough adapted to guide and preferably also to grip a flexible line passed therethrough.

An important feature of the invention resides in both the object holding means and the reel being journaled upon a common post.

Still another important feature of the invention resides in the post being shouldered to space the object holding means from the base plate and to thereby provide an annular space for the reel intermediate the object holding means and the base plate.

Another feature of importance resides in the provision of a key-shaped opening in the peripheral flange of the circular base plate which serves as a guide opening as well as means for gripping the flexible line against inadvertent movement through the guide opening.

Another feature of the present invention resides in the provision of line severing means on the peripheral flange of the base plate, whereby links of flexible line of desired length can be severed with the fisherman needing only one free hand for this purpose.

Other features of the invention reside in the provision of means carried by the post for releasing the object holding means and the reel, which can in one form of the invention comprise the post as having an integral enlarged free end and a threaded connection to the base plate, and in another form of the invention comprise a removable retainer ring that may be releasably fastened on the post adjacent the free end of the latter.

These and other important objects, aspects and features of the invention will become apparent during the following description of preferred embodiments of the invention when taken in conjunction with the accompanying drawings illustrative thereof, wherein:

FIGURE 1 is an isometric view of the underside of a device according to the invention;

FIGURE 2 is an exploded isometric view of the structure shown in FIGURE 1;

FIGURE 3 is a top plan view of the device shown in FIGURES 1 and 2, this view showing a hidden detail of construction in dashed outline and having a portion of the object holding means broken away to expose a portion of the reel disposed therebeneath;

Figure 15:
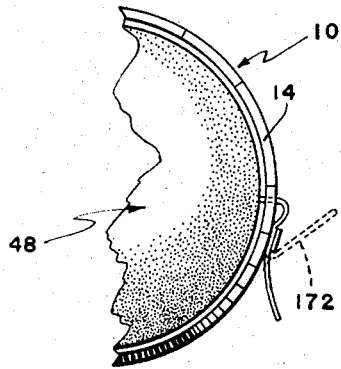
Figure 12:
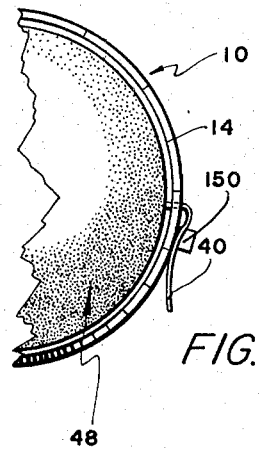
Figure 16:
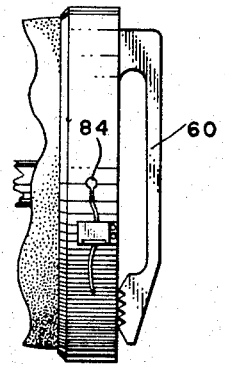
Figure 13:
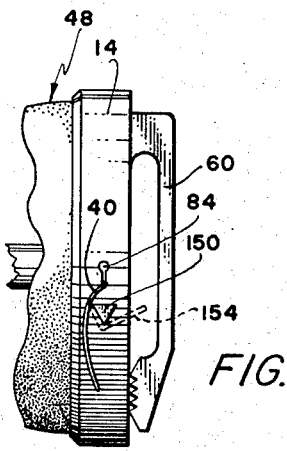
Figure 17:
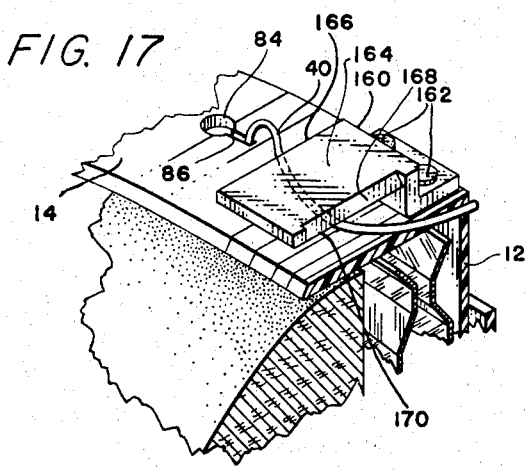
Figure 14:
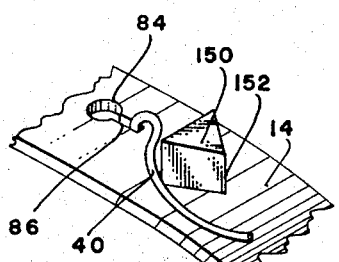

FIGURES 4 and 5 are respectively vertical sectional views taken upon the planes of the section lines 4—4 and 5—5 of FIGURE 3;

FIGURE 6 is an enlarged fragmentary isometric view of a modification of the structure shown in FIGURES 1 through 5, such modification consisting of the provision of a keyhole-shaped opening in lieu of the circular opening;

FIGURE 7 is an isometric view of another embodiment of the invention, this view showing the modified device mounted upon the belt of a wearer's clothing, and showing fishhook including elements piercingly held by the device;

FIGURE 8 is an exploded perspective view of the device shown in FIGURE 7;

FIGURE 9 is a top plan view of the device shown in FIGURES 7 and 8, the mounting clip being shown in dashed outline;

FIGURES 10 and 11 are respectively vertical sectional views taken upon the planes of the section lines 10—10 and 11—11 of FIGURE 9, respectively;

FIGURE 12 is a fragmentary top plan view of yet another embodiment of the invention including the provision of a line severing means;

FIGURE 13 is a side elevational view of the modified device shown in FIGURE 12, the position of the line during the act of severing being indicated in dashed outline;

FIGURE 14 is an enlarged isometric detail view of the line severing structure shown in FIGURES 12 and 13;

FIGURE 15 is a fragmentary top plan view of still yet another embodiment of the invention that differs in the provision of yet another article severing means, the flexible line being shown in severing position in dashed outline;

FIGURE 16 is a fragmentary side elevational view of the structure shown in FIGURE 15; and FIGURE 17 is an enlarged fragmentary isometric detail view illustrating particularly the line severing means of FIGURES 15 and 16.

Referring now to the drawings, wherein like numerals designate like parts throughout the various views, and directing attention initially to the form of the invention shown in FIGURES 1 through 5, the reference numeral 10 designates the combined holder and dispenser generally.

The device 10 comprises a circular base plate 12 having an integral upstanding peripheral flange 14 and a central upstanding boss 16 that is also integral therewith and extending in the same direction as the flange 14. The boss 16 has a blind bore 18 in its free end that is internally threaded as shown for threaded engagement with a radially reduced and externally threaded end portion 20 of a post 22. It will be noted that the post 22 is of less diameter than the boss 16, the arrangement being such that when the post 22 is threaded into the boss 16 as shown in FIGURES 4 and 5, a shoulder 24 is defined at the juncture of the post 22 and the boss 16. It will be noted that when the post 22 is threaded into the boss 16 as shown in FIGURES 4 and 5 that they jointly define a post of two-piece construction such that the pair constitute in effect a single post having a radially enlarged portion adjacent the base plate 12 having the axial extent of the boss 16. The end of the post 22 remote from the reduced threaded portion 20 thereof is radially enlarged as at 26 for a purpose to be presently explained, and such radially enlarged portion 26 terminates in a generally flat surface 28 provided with a plurality of radially extending raised portions 29, whereby a torque can be readily applied to the post 22 by applying thumb pressure against the surface 28 and the raised portions 29 and twisting to effect threaded engagement or disengagement of the post 22 with the boss 16.

The reference numeral 30 designates generally a reel which can be of conventional construction as shown, the same including axially spaced side walls 32 and 34 of annular configuration that are joined together at their radially innermost portions to define a hub 36, and which in their radially outermost peripheral portions are divergent as indicated at 36 and 38, respectively. The reel 30 is of conventional construction and leader such as intended for fishing purposes is presently marketed as wound upon reels such as that indicated at 30. Such conventional reels are customarily made of clear plastic, with plastics such as cellulose acetate, methyl methacrylate, and so forth, being suitable. Indeed, it is contemplated that in the use of the device of this invention fishermen will purchase leader or flexible line upon conventional reels such as that indicated at 30 and will employ such reel with the leader or flexible line wound thereabout jointly in conjunction with the device of this invention.

As clearly shown in FIGURES 4 and 5, the reel 30 with a flexible line or leader 40 wound thereon is journaled upon the portion of the post construction constituted of the boss 16, the latter rotatably being received through the hub 36 of the reel 30, and the free end 42 of the flexible line or leader 40 extends radially from the reel 30 passing through the diverging portions 36 and 38 thereof through a circular opening 44 provided in the flange 14.

Pierceable, object holding means is provided, such means being designated generally at 48. The means 48 is formed of a material that is pierceable so as to releasably retained pointed objects such as the barbed end of fishing hooks so as to retain the latter against inadvertent dislodgment therefrom. Construction materials suitable for the means 48 are well known, as for example, cork or cemented cork fragments, foam rubber, or expanded or foamed synthetic resins such as exemplified by the material marketed by the Dow Chemical Company of Midland, Mich., under the trademark "Styrofoam." A very large class of materials possess the desired pierceable characteristic such that the barbed end of a fishhook can be pressed thereinto such that the fishhook remain with its point embedded therein until a moderate degree of force is applied as by the fingers to withdraw the fishhook from the material.

The annular object holding means 48 formed of a material such as described above has a configuration generally corresponding to that of a hemisphere to define a convex surface 50 symmetrical about the axis of the post 22 and a planar surface 52. The object holding means 48 is provided with a cylindrical opening 54 therethrough of such size to receive the post 22 rotatably therethrough as shown in FIGURES 4 and 5. It will be noted that when the article holding means 48 is assembled on the post 22 as shown and the post 22 is secured to the boss 16 the shoulder 24 constituted of an end of the boss 16 engages the surface 52 of the object holding means 48 about the opening 54 so as to space the planar surface 52 from the base plate 12, whereby a space 58 is defined within which the reel 30 is free to rotate. Also, the radially outermost extremity of the object holding means 48 is rotatably received within the axially extent of the peripheral flange 14 of the base plate 12, it being noted that the flange 14 encircles the annular space 58.

The device 10 is provided with means whereby the same can be releasably attached to any suitable support such as the edge of a pocket in clothing, a belt or to an upstanding edge of a partition in a tackle box, such means comprising a clip 60 disposed on the side of the base plate opposite the post 22, the clip 60 being of an elongated generally rectangular configuration extending diametrically across the base plate 12 and having one end fixedly secured to and preferably integral with the base plate as indicated at 62. The intermediate extent 64 of the clip 60 is preferably spaced from the base plate 12 as clearly shown in FIGURES 1 and 5 (so as to readily receive the belt, not shown, of a fisherman therethrough) and the other end of the clip 60 is, as shown, inclined towards the base plate 12 and provided with a series of teeth 66 that terminate in at least close proximity to the base plate or are preferably biased against the base plate by the resilience of the clip 60. At the opposite ends of the series of teeth 66, inclined surfaces 68 and 70 are preferably provided so that the teeth 66 can be cammed with minimum difficulty over the edges of a belt on engaging and disengaging the clip 60 from the same.

As previously described, the base plate 12, the boss 16, the peripheral flange 14 and the clip 60 are of integral construction, and such construction can be of any suitable synthetic resin as, for example, acrilic resins such as marketed under the trademark Lucite by E. I. Dupont De Nemours & Company of Wilmington, Del. It is, of course, not essential that such components be of synthetic resin and can be made of metal if desired. The integral construction can when made of a synthetic resin be made by conventional injection molding techniques such as conventionally employed in the fabrication of articles of acrilic resins, polymeric amides such as commonly referred to as nylon, and so forth. If desired, the clip 60 can be molded as a separate element of synthetic resin and thereafter chemically welded or bonded as by the use of suitable solvents or the like to integrally formed base plate 12, flange 14, and boss 16 when the latter is made of synthetic resin. It is preferred, whether the clip 60 is made of a synthetic resin or of a metal that the same be of resilient character and fabricated in such a manner that the teeth 66 either engage or preferably are biased against the base plate 12.

It is preferred that the post 22 including the threaded portion 20 and the radially enlarged portion 26 thereof be of integral construction and made of the same material as the boss 16.

The use of the device 10 illustrated in FIGURES 1 through 5 will be readily understood. Initially, the free end 42 of the leader is fed through the opening 44 so as to extend outside the device 10 and the reel 30 is positioned on the boss 16. Then, the hemispherical pierceable member or object holding means 48 is positioned on the post 22 and the threaded portion 20 of the latter is threaded into the internally threaded recess 18, such threading operation being facilitated by the protuberances or raised portions 29 on the end of the post 22. After the post 22 has been firmly and threadingly engaged with the post 16, the reel 30 and the means 48 are free to rotate on the post 22 and the boss 16 with the radial enlargement 26 serving to retain such elements in assembled relation. It will be apparent that the device 10 can be disassembled by reversing the preceding description of assembly.

After the device 10 has been assembled as outlined above, the device 10 may be secured by use of the clip 60 to the belt of the user, the clip 60 being applied in such a manner that the toothed end of the latter is lowermost. The convex character of the curvature 50 is such that barbed hook portions such as those indicated at 70 and 72 of fishing lures such as those indicated at 74 and 76 respectively can be piercingly engaged in the object holding means 48 as indicated clearly in FIGURE 5. It will be observed that the convex character of the curvature 50 is such that such piercing engagement is facilitated by applying a pulling force upon the eye ends 78 and 80 of the lures 74 and 76, and conversely disengagement of the barbed points 70 and 72 can be easily effected upon applying positive pressures to the eyes 78 and 80 in the opposite direction. Clearly, such means of engaging and disengaging the lures 74 and 76 from the object holding means 48 entails virtually negligible likelihood of the user pricking himself.

It will also be noted that the rotatable mounting of the object holding means 48 enables the user to rotate the same so as to obtain a clear view of the fishing lure to be disengaged or of a portion of the surface 50 into which he desires to pierce and engage a fishing lure.

With the device 10 positioned on the belt of the user as described, the free end 42 of the leader is disposed through the opening 44 in such a position as to be readily engaged by the fingers of the user and that such amount of leader as desired may be pulled from the device 10 for such use as may be desired thereof. During withdrawal of the leader 40 through the opening 44, the reel 30 rotates on the portion of the post constituted of the boss 16, and the user simply severs the leader 40 some distance outwardly from the flange 14 so that the free end thus formed may be readily grasped for obtaining an additional length of leader. When the reel 30 is exhausted of leader 40, the user simply disassembles the device and winds a new supply of leader on the reel 30 or substitutes another reel already charged with a new supply of leader.

The device 10 can be clipped upon the belt of a user as explained, or clipped to the edge of an opening in a shirt or trousers if desired, and the device 10 can be clipped upon an upstanding partition within a tackle box, not shown, to constitute a means for storing a supply of fishing lures.

An extra supply of spare members or object holding means 48 may be retained in the tackle box of the user and constitute a means for storing various assortments of fishing lures which alternatively can be incorporated selectively with the other components of the device 10 as might be fit varying fishing conditions, etc.

The form of the invention illustrated in FIGURES 1 through 5 is subject to modification in the nature of making the opening 44 of key-shaped configuration rather than the circular configuration shown. Such modification in the character of the opening is shown in FIGURE 6, wherein such alternative, key-shaped opening is indicated at 84. The advantage of the key-shaped opening 84 resides in that the narrow lateral portion 86 of the opening 84 constituting a means for gripping the leader 40 so as to prevent inadvertent or undesired movement of the leader 40 through the opening 84, it being understood that the lateral width of the portion 86 of the opening 84 is such as to tightly grip the leader 40 when the latter is pulled laterally into such narrow confines.

A simpler version of the invention is illustrated in FIGURES 7 through 11 inclusive, such simplified version of the invention being in the nature of omitting the provision of a reel and the function of the leader dispenser. Such simplified version of the invention comprises the device designated generally at 90. The device 90 comprises a base plate 92 formed with a peripheral U-shaped flange 94 that is integral therewith. Also integral with the base plate 92 is a central upstanding post 96 having a generally cylindrical external configuration.

The outer axial extent of the post 96 is provided with axially extending cross cuts 98 and 100 that quarter the outer end of the post 96 in such a manner that the same may be resiliently compressed to reduce the overall radial extent of the same. Intermediate the axial extent of the cuts 98 and 100 the post 96 is provided with a circumferential groove 102 within which the radially inward peripheral extent of a retaining washer 104 is retained. The arrangement is such that when the washer 104 is seated in the groove 102, the washer 104 constitutes a radial enlargement of the post 96 at a position spaced from the base plate 92. In the preferred construction, the outer end of the post 96 is tapered as indicated at 106, whereby to constitute a camming edge to facilitate the washer 104 down upon the free end of the post 96 in such a manner that the washer 104 can move into a position so that the washer 104 seats in the groove 102 with the quartered end of the post 96 thereafter resiliently resuming its normal configuration to retain the washer 104 seated in the groove 102. When it is desired to remove the washer 104 from the post 96, it is only necessary that the fingers be employed to radially compress various circumferential portions of the free end of the post 96 which results in the washer 104 being freed from the groove 102 so that the washer 104 can be then freely removed from the post 96.

Pierceable object holding means is designated generally at 110 which corresponds generally in configuration and material of construction to that indicated previously at 48. The object holding means 110 is generally hemispherical and has a convex outer surface 112 and has an opening 114 therethrough for rotatably receiving therethrough the post 96. As will be evident upon inspection of FIGURES 10 and 11, the object holding means 110 is positioned on the post 96 and is thereafter releasably retained in such position by positioning the retaining washer 104 on the post 96 to seat the washer 104 in the retaining groove 102. Fishing lures such as those indicated at 120 and 122 can then be releasably engaged in the material 124 of the object holding means 110 as previously described in connection with the embodiment of the invention shown in FIGURES 1 through 5, inclusive.

The peripheral U-shaped flange 94 surrounds the radial outer margin of the object holding means 110 with sufficient running clearance being provided therebetween, and the base plate 92 is provided with an integral clip 126 in the same manner as the previously described clip 60 is secured to the previously described base plate 12.

In the preferred construction, the base plate 92, the peripheral flange 94, the post 96, and the clip 126 are integral and formed of a synthetic resin such as previously indicated suitable for use in the device 10. Alternatively, such elements can be of metallic or Fiberglas composition if desired.

In the use of the device 90, the latter is engaged to the belt 130 of a wearer by means of the clip 126, whereupon the object holding means 110 can be rotated to make most accessible from both the manual and visual standpoint various portions of the convex surface 112 for the engagement of barbed fishing lures or hooks such as those indicated at 134 in FIGURE 7.

The device 10 as shown in the modification of FIGURE 6, that is the device 10 shown in FIGURES 1 through 5 wherein the opening in the flange 14 is of keyhole shape, is subject to yet a further modification such as by the additional inclusion of line severing means, whereby a length of leader or line 40 drawn from the reel 30 can be severed. Such a modification is shown in FIGURES 12 through 14, wherein the flange 14 is provided with an integral projection 150 adjacent the keyhole-shaped opening 84. The prism-shaped projection 150 is preferably triangular shaped in cross section and includes at least one sharpened edge 152 over which an end of the leader can be drawn as indicated in dashed outline in FIGURE 13 at 154 to sever the leader 40. It will be noted that the leader severing means 150 is disposed at the narrow end of the keyhole-shaped opening 54 and that the sharpened edge 152 is directed away from the keyhole-shaped opening 54. The arrangement is such that when the leader 40 is pulled in such a manner as to draw the same into the narrow portion 86 of the opening to be wedged therein, the leader 40 can be drawn about the sharpened edge 152 and given an outward movement so as to be drawn therealong and severed. This results in the leader 40 being gripped in the narrow portion 86 of the opening 84 so that a short length of the leader 40 remains extending outwardly from the device 10 for subsequent grasping by the fingers.

Still another embodiment of the device 10 is shown in FIGURES 15 through 17 wherein a different form of leader or flexible line severing means is provided. Such alternate form of leader severing means comprises a metallic cutter 160 fixedly secured to the flange 14 adjacent the juncture of the latter with the base plate 12 by any suitable means such as the rivets indicated at 162. The metallic cutter 160 includes as best shown in FIGURE 17 a flat portion 164 that is offset and spaced from the flange 14 in general parallelism thereto, but preferably with the portion thereof most remote from being spaced in relatively closer proximity to the flange 14 than the edge 166 that is relatively near the keyhole-shaped opening 84. The edge having the slightly closer spacing to the flange 14 as described is beveled as indicate at 168 to provide a sharp cutting edge 170. It will be noted that the narrow extent 86 of the opening 84 is directed toward the cutter 160 and that the cutting edge 170 is directed away from the opening 84.

In the use of the leader severing means indicated in the embodiment of the invention shown in FIGURES 15 through 17, the leader 40 is drawn into the narrow extent 86 of the opening 84 and passed under the edge 166 of the leader severing means so that the leader 40 passes between the flat portion 164 of the cutter 160 and the flange 14, whereupon the remote end of the leader 40 is drawn so as to pull against the sharp edge 170 as indicated in dashed outline at 172 in FIGURE 15 which results in severing the leader 40.

With respect to the two embodiments of the invention shown in FIGURES 12 through 17, it will be noted in each case that the leader severing means is spaced from the keyhole-shaped opening 84 by an interval sufficient that the user can easily grasp a portion of the extent of the leader 40 between the opening 84 and the severed end thereof.

It is also to be noted that it is preferred with respect to each of the embodiments shown in FIGURES 12 through 17 that the sharpened edges 152 and 170 are disposed when the clip 60 is engaged over a belt of a fisherman so as to be directed downwardly. This removes substantially any hazard of the fisherman inadvertently cutting himself or any of his clothing on such sharpened edges.

Though it is contemplated that the device will be used primarily by fishermen, it is within the purview of this invention that the apparatus can be utilized for other purposes such as, for example, a sewing accessory, in which case the object holding means would serve to releasably hold or retain sewing needles in the manner previously described in relation to fishhooks and the like. When used as a sewing accessory or aid, the inclusion of the clip would of course be optional (indeed, a conventional suction cup or conventional stick pin, with or without a safety retaining clasp, can be substituted therefor as mounting means whereby the device can be attached to a table surface or pinned to the clothing of the user). Also when used as a sewing accessory, the device can be proportioned to accommodate conventional reels or spools such as commercially available in association with sewing thread wound thereon and sold therewith. Since such reels or spools have a greater ratio of axial extent to radial extent than the illustrated and described reel or spool on and with which fishing leader is presently being marketed, it is clearly within the skill of the art to provide a central recess (which recess can, if desired, or deemed expedient, have flared sides) in the end of the object holding means facing the base plate to accommodate the proportionally greater axial extent and smaller diameter spools or reels in such a manner as to preserve an adequate diameter of the holding means insofar as the basic function of the latter is concerned.

Fabric, such as conventionally employed in pin cushions and the like can be incorporated in the object holding means if desired or deemed expedient, this being particularly true when the objects held or pierced into such means are not barbed and will not be so likely as to be firmly snagged in a fabric material. Obviously, a great deal of latitude can be exercised in the choice of materials used in the object holding means, it being only necessary that such means be pierceable by finger applied sharp objects (fishhooks, sewing needles, and the like) and possess a sufficient degree of rigidity to retain substantially its overall configuration to such an extent as to be retainable on and rotatable on the post without binding or seizing on the reel or base plate. Such means can obviously be a porous homogenous material or constituted of heterogenous materials (composite construction) all within the scope of the purposes of the invention as exemplified by the description and depictions of preferred embodiments of the invention.

It will be clearly evident that each and every illustrated and described embodiment of the invention is susceptible to many other variations in detail well within the normal skills of the art without departing from the spirit of the invention. Accordingly, attention is directed to the appended claims in order to ascertain the actual scope of the invention.

I claim:

1. An article of manufacture comprising a base plate, object holding means comprising a body of pierceable material for releasably retaining objects pierced thereinto, mounting means securing the holding means to the base plate for rotation relative thereto about an axis normal to the base plate, said holding means having an exposed surface facing from the base plate that is substantially symmetrical about said axis, said exposed surface being convex, said mounting means including a post carried by and extending from the base plate, said holding means having an opening therethrough in which the post is journaled, means carried by the post at a position remote from the base plate for releasably preventing withdrawal of the post from the opening through the holding means comprising the post having an end portion remote from the base plate, said end portion having an integral radial enlargement, threaded means removably securing the post to the base plate, said end portion being provided with means enabling application of torque thereto for operating the threaded means, said threaded means including a base post fixed to the base plate and projecting in alignment toward and into abutting relation to the first mentioned post, one of said posts having an internally threaded recess with the other post having an externally threaded male portion threadingly received in the recess, said base post being radially larger than the first mentioned post and the opening through the holding means to define a shoulder facing the holding means and spacing the latter axially from the base plate, and spool means for flexible line disposed between the holding means and the base plate and journaled for rotation on the base post.

2. The combination of claim 1, including said base plate being provided with means for guiding a flexible line from the spool.

3. The combination of claim 2, including said base plate being provided with means for severing a flexible line at a position adjacent the means for guiding such a line and remote from the spool.

4. A fisherman's accessory including a base plate, a post carried by and projecting from the base plate, an annular body of pierceable material journaled for rotation on a first portion of the post in spaced relation to the base plate, an annular reel journaled for rotation on a second portion of the post at a position intermediate the base plate and the annular body, means for maintaining the annular body spaced from the base plate, said base plate being provided with an annular flange disposed about the reel in spaced relation thereto, said flange having an opening therethrough adapted to receive line from the reel therethrough, and means on the post for releasably preventing removal of the annular body and the reel from the post.

5. The combination of claim 4, wherein the means for maintaining the annular body spaced from the base plate comprises the second portion of the post having a greater diameter than the first portion of the post.

6. An article of manufacture comprising a generally circular base plate having first and second sides provided with a post extending centrally from the first side of the base plate, annular object holding means journaled on the post of pierceable material for releasably retaining objects pierced thereinto, said last means having a side opposite the base plate having a generally convex configuration, said post being provided with means for preventing removal of said object holding means from the post, said base plate being provided with means disposed on the second side thereof for mounting the base plate on a support, said object holding means being spaced from the base plate to define an annular space therebetween, said post being adapted to accommodate a reel of flexible line journaled thereon between the object holding means and the base plate, said base plate having a peripheral flange extending about said space, and said flange having an opening therethrough adapted to guide and grip a flexible line passed therethrough.

7. An article of manufacture comprising a generally circular base plate having first and second sides provided with a post extending centrally from the first side of the base plate, annular object holding means journaled on the post of pierceable material for releasably retaining objects pierced thereinto, said last means having a side opposite the base plate having a generally convex configuration, said post being provided with means for preventing removal of said object holding means from the post, said base plate being provided with means disposed on the second side thereof for mounting the base plate on a support, said object holding means being spaced from the base plate to define a space therebetween, a reel for flexible line in said spaced and journaled on the post, said base plate having a peripheral flange extending about said space, and said flange having an opening therethrough for receiving therethrough flexible line from the reel.

8. The combination of claim 7, wherein said means for preventing removal of the object holding means is releasable, whereby the object holding means and the reel can be removed from the post.

References Cited

UNITED STATES PATENTS

| | | | |
|---|---|---|---|
| 779,937 | 1/1905 | Holt | 43—43.11 |
| 903,879 | 11/1908 | Nusly | 46—58 |
| 1,624,233 | 4/1927 | Griffin | 43—57.5 |
| 2,578,424 | 12/1951 | Hart | 43—57.5 |
| 2,785,869 | 3/1957 | Howard et al. | 43—54.5 X |
| 2,799,118 | 7/1957 | Lullo | 46—26 |
| 2,813,364 | 11/1957 | Appleman | 43—19.2 |

FOREIGN PATENTS 401,113    11/1933    Great Britain.

HUGH R. CHAMBLEE, *Primary Examiner.*

SAMUEL KOREN, *Examiner.*